United States Patent
Ruhlmann et al.

(10) Patent No.: US 8,146,315 B2
(45) Date of Patent: *Apr. 3, 2012

(54) SUSPENDED CEILING-SUPPORT DEVICE

(76) Inventors: René Philippe Ruhlmann, Griesheim sur Souffel (FR); Marie Jeanne Ruhlmann, Griesheim sur Souffel (FR)

( * ) Notice: Subject to any disclaimer, the term of this patent is extended or adjusted under 35 U.S.C. 154(b) by 963 days.

This patent is subject to a terminal disclaimer.

(21) Appl. No.: 11/568,642

(22) PCT Filed: May 10, 2005

(86) PCT No.: PCT/FR2005/050308
§ 371 (c)(1),
(2), (4) Date: Aug. 8, 2007

(87) PCT Pub. No.: WO2005/113910
PCT Pub. Date: Dec. 1, 2005

(65) Prior Publication Data
US 2008/0127585 A1    Jun. 5, 2008

(30) Foreign Application Priority Data
May 11, 2004  (FR) ..................... 04 50907

(51) Int. Cl.
*E04B 2/00*    (2006.01)
(52) U.S. Cl. ............... 52/506.06; 52/302.3; 52/716.1; 454/296
(58) Field of Classification Search .......... 52/302.2, 52/302.3, 506.06–506.1, 716.1; 454/296
See application file for complete search history.

(56) References Cited

U.S. PATENT DOCUMENTS

| | | | | | |
|---|---|---|---|---|---|
| 2,239,508 | A | * | 4/1941 | Sipp et al. | 454/296 |
| 3,319,558 | A | * | 5/1967 | Bodian | 454/296 |
| 3,403,614 | A | * | 10/1968 | Carnes | 454/294 |
| 3,543,669 | A | * | 12/1970 | Kodaras | 454/296 |
| 3,577,904 | A | * | 5/1971 | Lambert | 454/301 |
| 3,831,506 | A | * | 8/1974 | Landheer | 454/303 |
| 3,894,366 | A | * | 7/1975 | Arnett | 52/37 |
| 4,672,887 | A | * | 6/1987 | Sproul, Sr. | 454/233 |
| 5,937,592 | A | * | 8/1999 | Tamlyn | 52/95 |
| 2004/0020235 | A1 | | 2/2004 | Triboix | |

FOREIGN PATENT DOCUMENTS

| | | |
|---|---|---|
| CH | 569 163 | 11/1975 |
| EP | 0 421 405 A1 | 10/1990 |
| FR | 2 597 906 | 10/1987 |

* cited by examiner

Primary Examiner — William Gilbert
(74) Attorney, Agent, or Firm — Perman & Green, LLP

(57) ABSTRACT

A device for supporting a suspended ceiling includes a section that is able to support the suspended ceiling and spacers disposed between the section and the walls of the building. A removable panel is mounted on a section, the panel being able to reduce a space provided between the wall and the section at least at the location of the section bearing the aforementioned panel. At least one of the spacers may simultaneously include means for fixing the spacer to the section and means for fixing the spacer directly to a wall or to a ceiling of the building, in such a way that the spacer may be secured to the wall or the ceiling and the section may not be secured to the wall or the ceiling without a spacer.

17 Claims, 6 Drawing Sheets

SUSPENDED CEILING-SUPPORT DEVICE

CROSS-REFERENCE TO RELATED APPLICATIONS

This application is the National Stage of International Application No. PCT/FR2005/050308, International Filing Date, 10 May 2005, which designated the United States of America, and which International Application was published under PCT Article 21 (s) as WO Publication No. WO2005/113910 A2 and which claims priority from, and the benefit of, French Application No. 200450907, filed 11 May 2004.

The aspects of the disclosed embodiments relate to a device for supporting a suspended ceiling on a ceiling or walls of a building. More precisely, the aspects of the disclosed embodiments relate to such a device for supporting a suspended ceiling allowing a space between the walls of a building and the fixation device to be provided, in such a way as to allow passage of air between a volume of the building and a volume provided between the ceiling and the suspended ceiling. The aspects of the disclosed embodiments relate to, more precisely, means allowing a constant space or gap to be maintained between the walls and the device for supporting a suspended ceiling in such a way as to have the necessary spread for the desired flow of air along the walls. The aspects of the disclosed embodiments relate to such a device for supporting a suspended ceiling equipped with means allowing a variable closing of the space provided between the wall and the fixation device.

The aspects of the disclosed embodiments particularly find applications in the field of air conditioning or ventilation of buildings. In fact, air ventilation, conditioning and filtration devices are generally disposed in the volume created between the ceiling and the suspended ceiling, the air has to flow along the walls.

BACKGROUND

Currently, to allow passage of air from the volume created between the ceiling and the suspended ceiling of a building, and conversely, utilizing a separator disposed between the walls of the building and the device for supporting the suspended ceiling is known. The separators are regularly disposed, in order to ensure that a constant distance is maintained between the wall and the support device. Therefore, these separators reserve a space allowing the distribution of air over the entire periphery of the building, for example treated and/or tempered air, after its passage in the volume provided between the suspended ceiling and the ceiling. The separators are, for example, fixed through screws on the walls or on the suspended ceiling support device.

While installing a suspended ceiling in a building, by means of a support device from the prior art such as described previously, it is necessary to proceed in several successive steps. First, the separators are fixed spaced apart on the walls of the building at a specific height with relation to the ceiling in order to create the desired volume between the suspended ceiling and the ceiling. So that the separators are all at the same level, it is necessary to affix a visual mark on the walls over the entire periphery of the building, indicating the level at which the separators should be fixed. Once the separators are fixed, the device for supporting the suspended ceiling is brought to abut against these separators, then the suspended ceiling support device is fixed to the wall or the ceiling. Once the suspended ceiling support device is fixed to the wall, or to the ceiling, the suspended ceiling is connected to the suspended ceiling support device.

In the case where the separators are not fixed to the wall but to the suspended ceiling support device, one must, prior to fixing the suspended ceiling support device to the walls or the ceiling, proceed with a fixation of the separators on the support device in such a way that the separators are regularly spaced apart. The support device is then fixed on the walls or the ceiling of the building.

In both cases, it is necessary to proceed in several steps to mount the suspended ceiling in a building. A significant loss of time and risks of misaligning the separators from each other follows, creating a distance between the walls and the suspended ceiling support device that may vary from one point to another in the building. In fact, fixation of the support device on the walls or ceiling is independent from the separator and from its position.

Allowing modulation in the passage of air by modifying the space created between the suspended ceiling support device and the walls is known, even though the distance between the support device and the walls is fixed. In fact, being able to vary the passage of air turns out to be useful, not only in the entire building, according to an outside temperature for example, but also to be able to vary the passage of air from one point to another in the same building. For example, when the sun is reflected against the windows of the building, it may be useful to have a stronger airflow at the location of the building where the windows are situated than at a location of the building that lacks windows, so that a stronger flow of fresh air arrives at the location of the windows. Conversely, when the outside temperature is low, the presence of the window allowing cold air to be filtered from the outside necessitates a stronger passage of hot air at the location of the building where the windows are situated than at another location of said building.

Actually, means allowing a variable closing of the space provided between the walls and the suspended ceiling support device often have complex constructions. In addition, these pieces are generally integral with the suspended ceiling support device on a face of the support device directed towards the ceiling. Such means allowing a variable closing of the space provided between the walls and the suspended ceiling support device are therefore no longer accessible once the suspended ceiling is installed. To access said means, it is necessary to at least partially disassemble the suspended ceiling prior to access.

SUMMARY

In the disclosed embodiments, we aim to resolve the problems stated above by proposing a device for supporting a suspended ceiling such that a constant desired distance between the walls and the support device is obtained thanks to the support device itself. To achieve this, the means for fixing the device for supporting the suspended ceiling on a wall or ceiling are equipped with means allowing the desired constant space to be maintained between the wall and the support device. Therefore, a step during the installation of a suspended ceiling in the building to be equipped with said suspended ceiling is eliminated. In fact, during the step of attaching the fixation means to the walls or ceiling, fixation of the support device to the walls or ceiling and the creation and conservation of the desired distance between the wall and the support device are obtained at the same time. Fixation of the suspended ceiling support device is directly linked to the positioning of means allowing a constant spacing between the walls and the support device.

The fixation means and the means for supporting the desired spacing between the wall and the suspended ceiling support device form a single piece, said piece advantageously being obtained by molding a monobloc piece. Therefore, it is possible to very quickly make such molded monobloc pieces, all identical, in large numbers. When the pieces utilized for installing a suspended ceiling in a building come from the same mold, one is assured that the space created between the walls and the support device is the same over the entire periphery of the building.

In the disclosed embodiments, a device for supporting a suspended ceiling such that a constant spacing over the entire periphery of the building between the walls and the suspended ceiling support device may be closed in a modifiable manner is also proposed. To do this, the support device according to the disclosed embodiments may be equipped with a plurality of panels disposed, as needed, along a contour of the support device directed towards the walls in such a way as to seal all or part of the space provided between the walls and the support device, and to modulate the airflow. Such panels may for example be latched in a non-irreversible manner on the support device, so that it is possible to remove all or part of said panels as needed, without having to touch the structure itself of the suspended ceiling.

In addition, it is possible to provide that these panels be mounted sliding on the suspended ceiling support device, in order to be displaced along the support device.

Therefore, the object of the disclosed embodiments is a device for supporting a suspended ceiling in a building, comprising a section that is able to support the suspended ceiling, spacers disposed between the section and the walls of the building, providing a space to allow air to circulate, wherein the device comprises at least one removable panel mounted on the section, the panel being able to reduce or obstruct the space provided between the wall and the section.

In the particular examples of embodiment of the suspended ceiling support device of the disclosed embodiments, said device may comprise all or part of the following characteristics:

the panel comprises a strip extending in projection from the section, in the direction of the wall;

the device comprises a set of removable panels having different lengths of strips;

the panel is able to be elastically engaged over an edge of the section;

the panel is able to slide along said edge;

the panel may be displaced on the section, in a direction perpendicular to the wall, in such a way as to modulate the space provided between the wall and the section.

a first extremity of the panel is equipped with a hook, the panel may be displaced in a direction perpendicular to the wall by means of said hook.

a second extremity of the panel, mounted on a flange of the section, is equipped with an oblong fixation opening, a screw traversing the oblong fixation opening and the flange of the section.

the device comprises a means for fixing the section to a wall of the building, said section fixation means being fixed to a flange of the section, the panel being inserted between the flange of the section and the section fixation means.

the panel is maintained on the section, a position of the panel on the section being maintained by a flexible rod, a first extremity of the flexible rod being fixed to the section and a second extremity of said flexible rod in flexible support on the panel.

the panel is fixed to the section by a spring loaded screw.

the strip is a flexible strip.

an inner face of the panel, directed towards the wall of the building, is equipped with a plurality of steps extending perpendicularly to the wall and able to receive a first extremity of the strip of the partially bent panel.

the support device comprises an edge molding fixed to the section.

Another object of the disclosed embodiments is a device for supporting a suspended ceiling in a building, comprising a section that is able to support the suspended ceiling, spacers disposed between the section and the walls of the building, providing a space to allow air to circulate, wherein a spacer simultaneously comprises a means to fix the spacer to the section and a means to fix the spacer directly to a wall of the building in such a way that the spacer may be secured to the wall and the section may not be secured to the wall without a spacer.

In particular examples of embodiment of the disclosed embodiments, the suspended ceiling support device may comprise all or part of the following additional characteristics:

a spacer has a general L shape, a strut of the L being fixed to an upper flange of the section and extending parallel to said upper flange, and a base of the L extending substantially parallel to the walls of the building in such a way as to be able to be fixed to a wall of the building, the strut of the L extending in projection from the upper flange of the section in the direction of the wall;

a spacer has a general U shape, a first branch of the U being fixed to an upper flange of the fixation section and extending parallel to said flange, a second branch of the U being able to be fixed to the ceiling, a base of the U extending parallel to the wall in the direction of the ceiling, the branches and the base of the U providing a cavity that is open towards the inside of the building, the first branch of the U comprising a tab extending in projection from the upper flange of the section in a direction opposite to the direction of the branches of the U, the tab being designed to abut against the wall;

a spacer has a general U shape, a first branch of the U being fixed to an upper flange of the fixation section and extending parallel to said flange, a base of the U extending parallel to the wall in the direction of the ceiling and a second branch of the U extending parallel to the ceiling in the direction of the wall and being able to be fixed to said ceiling, the second branch of the U being designed to abut against the wall.

The suspended ceiling support device according to the disclosed embodiments may also comprise, on the one hand, one or more removable panels allowing the space provided between the wall and the section to be adjusted and, on the other hand, the spacer allowing the section to be fixed and a constant spacing between the section and the walls to be maintained.

BRIEF DESCRIPTION OF THE DRAWINGS

The disclosed embodiments will be better understood upon reading the following description and examining the accompanying figures. The figures are presented for indication purposes only and in no way limit the disclosed embodiments. The figures show.

DETAILED DESCRIPTION

Figure 1:
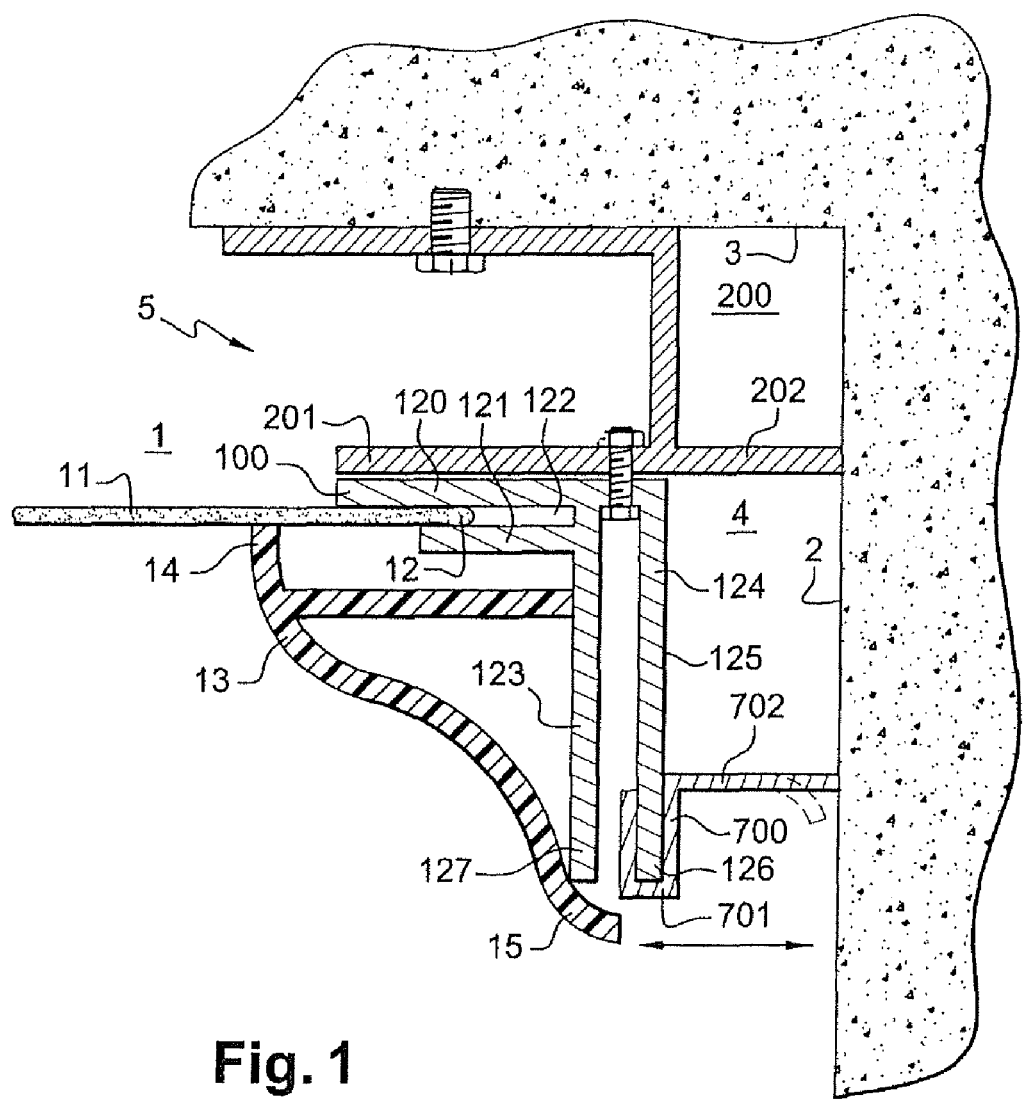
FIG. 1: a section in a plane perpendicular to a wall of a suspended ceiling support device according to an example of embodiment of the disclosed embodiments.
Figure 2:
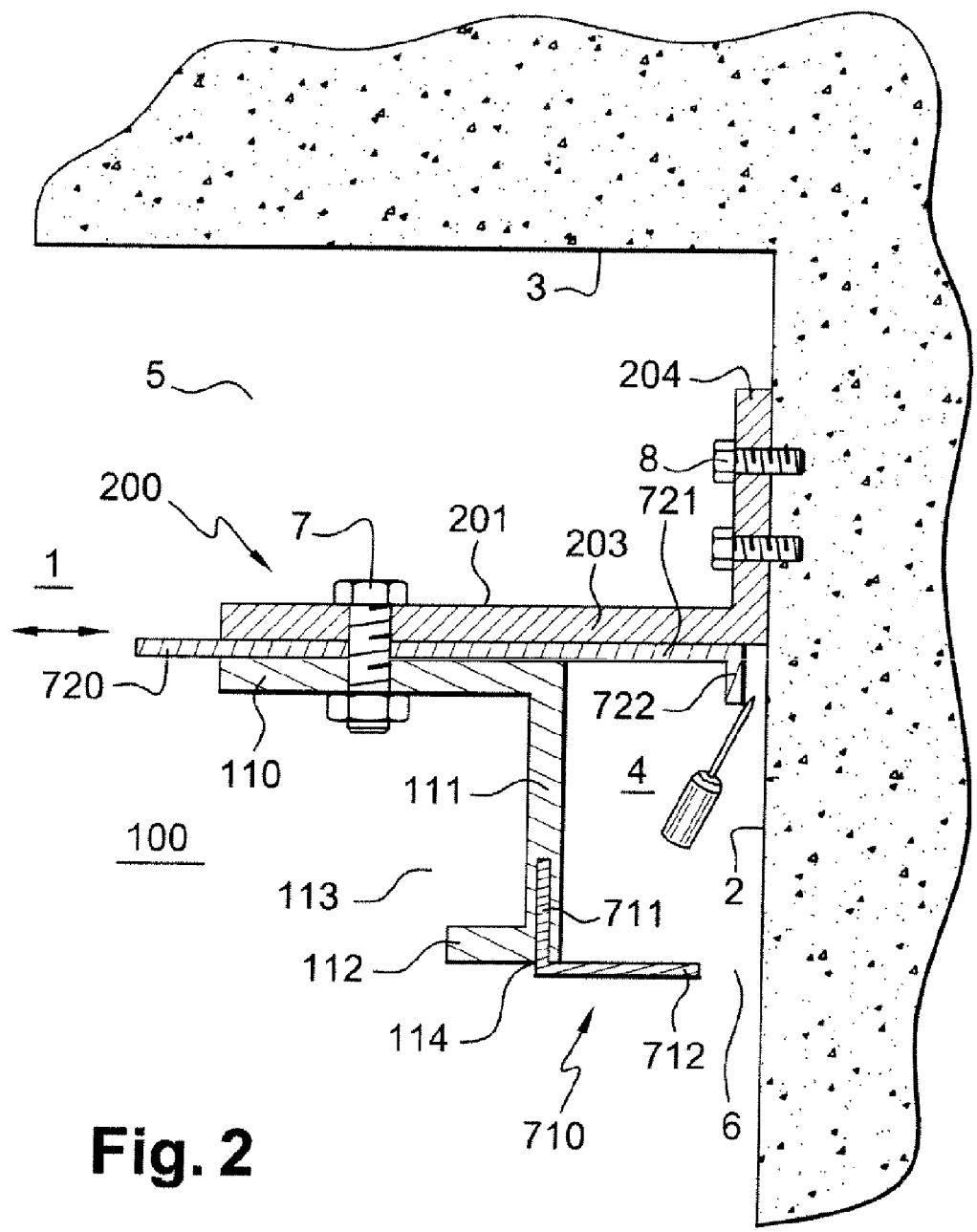
FIG. 2: a section in a vertical plane perpendicular to a wall of a device of the disclosed embodiments according to another example of embodiment of the disclosed embodiments.

In FIG. 1, one may see an example of embodiment of a device 1 for supporting a suspended ceiling on a ceiling 3 according to a first example of embodiment of the disclosed embodiments. In FIG. 2 may be seen another example of embodiment of a suspended ceiling support device 1 on a wall 2.

With reference to these drawings, the device 1 according to the disclosed embodiments comprises means 202 for maintaining a constant spacing between a fixation section 100 of the support device 1 and the wall 2 of the building in which the suspended ceiling may be disposed (only one means 202 is visible in FIG. 1). Due to these means 202 for maintaining a constant spacing between section 100 and wall 2, a space 4 is provided between wall 2 and section 100. This space 4 allows air to flow from a space 5 provided between the suspended ceiling and the ceiling 3 to the inside of the building over the entire periphery of said building.

In the example represented in FIG. 1, fixation section 100 has the general shape of a square. The section 100 is equipped with an upper flange 120 and a lower flange 121 parallel to each other and to ceiling 3. A space 122 is provided between the two flanges 120 and 121 that is able to receive an extremity 12 of a suspended stretch ceiling 11. The section 100 also comprises two lateral flanges, respectively external flange 123 and internal flange 124. Internal flange 124 is understood to refer to the lateral flange directed towards space 4, by opposition to external flange 123 that is directed towards the building. The lateral flanges 123 and 124 are parallel to each other and perpendicular to upper 120 and lower 121 flanges and extend downward, parallel to wall 2. Extend downward is understood to refer to extension in the direction of the floor of the building.

In another example of embodiment, it is possible to provide a section that lacks the lower flange. In this case, it is possible to house the extremity of the suspended ceiling in a space provided between the two lateral flanges of the section.

A spacer 200 of the disclosed embodiments comprises means 201 for fixing support device 1 on wall 2 and means for maintaining a constant spacing 202. In the example represented in FIG. 1, the monobloc spacer 200 has a general U shape. Different examples of embodiment of the monobloc piece will be studied subsequently.

The panel 700 is integral with a bottom extremity 126 of one of the lateral flanges 124. Bottom extremity 126 is understood to refer to the extremity of the lateral flange 124 directed towards the floor, in opposition to the top extremity directed towards the ceiling 3. The panel 700 is latched on extremity 126 through latching means 701. A strip 702 of panel 700 extends in projection with relation to lateral flange 124 in the direction of wall 2 in such a way as to seal a passage of air at the location of space 4.

In the example represented in FIG. 1, a length 706 (FIG. 4) of panel 702 allows space 5 to be completely sealed in such a way that at the location of the section 100 where panels 700 are located, air may not transit from space 5 provided between ceiling 3 and suspended ceiling 11 to the inside of the building. Length 706 of strip 702 is understood to refer to the dimension of the strip 702 that extends perpendicularly to the wall 2.

In other examples of embodiment, it is possible to provide section 100 with panels 700 whose strips 702 have a length 706 such that the length only partially seals passage 4, so as, for example, to only reduce the airflow to the location of section 100 where these panels 700 are located. Furthermore, one may provide the same section 100 with panels 700 having different lengths 706 of strips 702.

Examples of panels will be described in further detail subsequently.

In FIG. 1, external lateral flange 123 has a cornice, or molding 13. A top extremity 14 of cornice 13 comes in contact with the suspended stretch ceiling 11. Top extremity 13 is understood to refer to the extremity of the cornice 13 directed towards the suspended ceiling 11. A bottom extremity 15 of cornice 13, opposite from top extremity 14, comes in contact with a bottom extremity 127 of external lateral flange 123. The cornice 13 is fixed by any means to lateral flange 123. Therefore, an elegant finishing of the installation of the suspended ceiling 11 is obtained, as the cornice conceals the section 100 over the entire perimeter of the building.

In FIG. 2 may be seen another example of embodiment of a suspended ceiling support device 1 according to the disclosed embodiments. The section 100 is provided with an upper flange 110 extending parallel to ceiling 3, a lateral flange 111 extending parallel to wall 2 and substantially perpendicular to upper flange 110, and a lower flange 112 extending substantially parallel to ceiling 3 and to upper flange 110. The flanges 110, 111 and 112 provide a cavity 113, wherein an opening is directed towards the inside of the building. In this space 113 may be housed an external contour of a suspended ceiling (not represented).

Here spacer 200 comprises a fixation device 201, 203, 204 of section 100 of support device 1 wherein one shape is such that it allows, on the one hand, section 100 to be connected to wall 2, and, on the other hand, the desired constant spacing to be maintained between section 100 and the wall 2. This example of embodiment will be studied in further detail in the rest of the description.

In FIG. 2, the example of device 1 is equipped with two different examples of embodiment of panels. Of course, a single panel is sufficient to regulate the airflow to the location of a given segment of the section 100.

The lateral flange 111 is equipped with a slot 114 in which is housed an attachment area 711 for a panel 710 wherein one strip 712, substantially perpendicular to the engaging area 711, extends projecting from said engaging area 711 in the direction of wall 2, in such a way as to reduce a passage 6 by which the air contained in space 5 provided between the suspended ceiling and ceiling 3 may flow in the direction of the building.

The fixation device 1 represented in FIG. 2 comprises another panel 720. The panel 720 comprises a strip 721 and a hook 722. The strip 721 comprises an oblong opening for the passage of a screw (not visible in FIG. 2).

Figure 5:
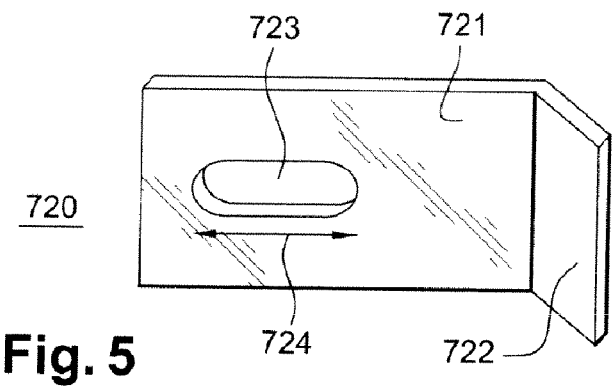
FIG. 5: a second example of embodiment of a panel of the disclosed embodiments.

The panel 720 is represented in detail in FIG. 5. The panel 720 may be utilized in different manners to modulate the space provided between the section and the wall.

For example, in FIG. 2, panel 720 is inserted between upper flange 110 of section 100 and spacer 200. The oblong opening of panel 720 coincides with the opening of spacer 200 and the opening of section 100. The same screw 7 allows section 100, panel 720 and spacer 200 to be fixed. However, the mounting is such that a sufficient clearance exists between section 100 and panel 720 on the one hand and between panel 720 and spacer 200 on the other hand, so that the panel 720 may be displaced on the section 100 in the direction of the wall 2 or in a direction opposite from wall 2. When one wants to modify the position of panel 720 on section 100, the panel 720 is pulled or pushed by its hook 722. A length 724 of the oblong opening 723 (FIG. 5) allows the space between section 100 and wall 2 to be varied. Length 724 of the oblong opening 723 is understood to refer to the dimension of the opening 723 in the direction perpendicular to wall 2.

More generally, panel 720 is mounted sliding on flange 110 of section 100 in such a way as to be able to be displaced in a direction perpendicular to the wall and to therefore modulate the passage of air 6.

In the examples represented in FIGS. 1 and 2, upper flange 120 or 110 of section 100 is integral with fixation means 201 through a screw and a nut. It is also possible to connect flanges 120 or 110 and fixation means 201 by gluing or soldering, or by any other known appropriate means.

In the disclosed embodiments, and as represented in FIGS. 1 and 2, the means 201 for fixing section 100 to ceiling 3 or to wall 2 of the building as well as means 202 for maintaining a constant spacing between section 100 and wall 2 are formed by a monobloc spacer 200.

FIGS. 3a, 3b, 3c and 3d represent four different embodiments of such a spacer. In all cases, the spacer comprises a stop extending in projection with relation to the section, in the direction of the wall, in order to form a means for maintaining a constant spacing, the stop being designed to rest against the wall, and means for fixing the spacer on the one hand to the section and on the other hand to the walls or to the ceiling of the building.

Figure 3A:
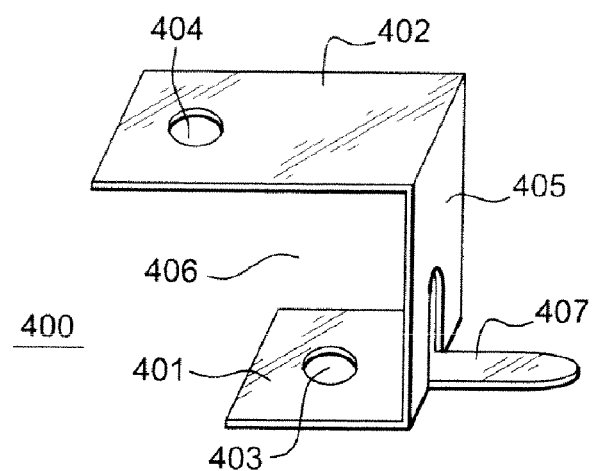
FIGS. 3a to 3d: examples of embodiment of a spacer of the disclosed embodiments.

FIG. 3a represents a first example of embodiment of a spacer 400. The monobloc spacer 400 has a general U shape. A first branch 401 of the U 400, or lower branch, is designed to be connected to upper flange 120 or 110 of a section 100, through, for example, a screw passing through an opening 403. A second branch 402 of the U 400, substantially parallel to first branch 401, is designed to be connected to ceiling 3 through a screw, for example, passing through an opening 404. A base 405 of the U extends substantially perpendicularly to branches 401 and 402. A cavity 406, provided between base 405 and two branches 401 and 402 of the U 400, is designed to be directed towards the inside of the building. A tab 407 extends in projection from lower branch 401, in an extension of said branch 401, in a direction opposite to the direction of branch 401. The tab 407 is designed to rest against wall 2 in such a way as to form a means for maintaining the spacing between section 100 and wall 2 in order to create space 4. It is also possible to make a spacer 400 in which the tab extends in projection and in the extension of the upper branch 402. The spacer 400 therefore allows on the one hand the section, to which it is connected, to be fixed to the ceiling, and on the other hand a constant space between the wall and said section to be maintained.

Figure 3B:
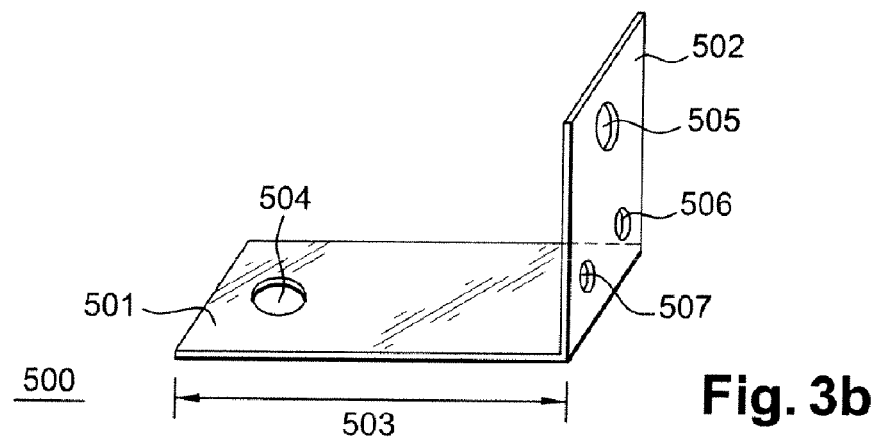

FIG. 3b represents a spacer 500 according to another example of embodiment of the disclosed embodiments. The spacer 500 has a general L shape. A strut 501 of the L 500 is designed to extend substantially parallel to ceiling 3. The strut 501 may be connected to upper flange 120 or 110 of section 100 through a screw passing through an opening 504 provided on said strut 501. A base 502 of the monobloc spacer in L 500 extends perpendicularly to the strut 501, and is designed to be connected to wall 2. A length 503 of the strut 501 is such that when the base 502 is next to wall 2, a space 4 is provided between section 100 and said wall 2. To do this, the length 503 of the strut 501 is strictly greater than a width of the section 100 to which it is connected. Width of the section 100 is understood to refer to the dimension of the section 100 perpendicular to the wall 2. The strut 501 is next to said section 100 over the entire width of said section 100 and extends in projection from said section 100 in the direction of the wall 2, as represented in FIG. 2. The base 502 of the L 500 may be fixed to the wall through, for example, three screws respectively passing through openings 505, 506 and 507 provided on the branch 502. The multiplication of the number of fixation screws allows, for example, a leverage effect undergone by the L-shaped spacer 500 to be interfered with when the suspended ceiling is supported by the support device 1.

Figure 3C:
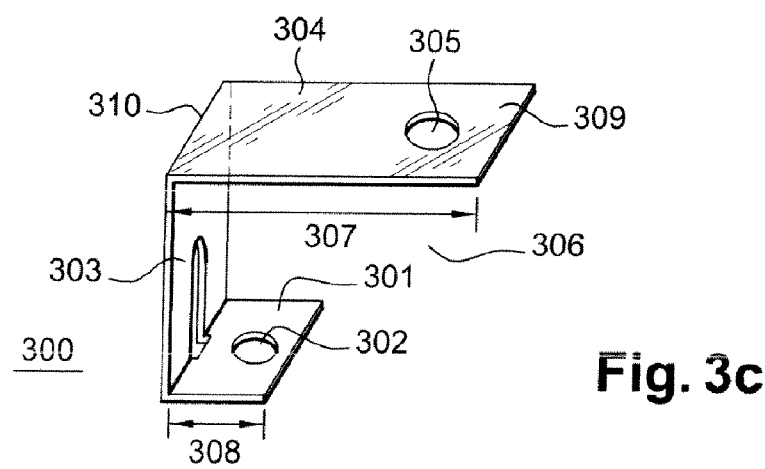

FIG. 3c represents a third example of a spacer 300 of the disclosed embodiments. Spacer 300 has a general U shape. A first branch 301 of the U 300, or lower branch, is designed to be connected to an upper flange 120 or 110 of section 100. To do this, a screw passage opening 302 is provided on branch 301 of the U. A base of the U 303 is designed to extend parallel to wall 2, and extends substantially perpendicularly to branch 301. A second branch 304 of the U 300 extends perpendicularly to base 303 and parallel to the first branch 301. The second branch 304, or upper branch, is designed to be connected to ceiling 3. To do this, a screw passage opening 305 is provided on upper branch 304. A cavity 306 provided between branches 301 and 304 and base 303 of the U 300 is directed towards wall 2. A length 307 of upper branch 304 of the U 300 is strictly greater than a length 308 of lower branch 301. Length 307 or 308 of branches 304 or 301 of the U 300 is understood to refer to the dimension of branches 301 or 304 perpendicular to the plane of the wall of the relevant building. An extremity 309 of the upper branch 304, opposite to extremity 310 integral with base 301, is designed to abut against the wall of the building. As upper branch 304 is longer than first branch 301, a space 4 (FIGS. 1 and 2) is therefore provided between the wall and the section 100, corresponding to the difference between the length 307 of upper branch 304 and the length 308 of first branch 301. The spacer 300 therefore allows, on the one hand, the section to which it is connected to be fixed to the ceiling, and on the other hand a constant space to be maintained between the wall and said section. An extremity 309 of the upper branch 304, opposite to extremity 310 that is integral with the base 301, is designed to abut against the wall of the building. As upper branch 304 is longer than first branch 301, a space 4 (FIGS. 1 and 2) is therefore provided between the wall and the section 100, corresponding to the difference between the length 307 of upper branch 304 and the length 308 of first branch 301. Spacer 300 therefore allows on the one hand the section, to which it is connected, to be fixed to the ceiling, and on the other hand a constant space to be maintained between the wall and said section.

Figure 3D:
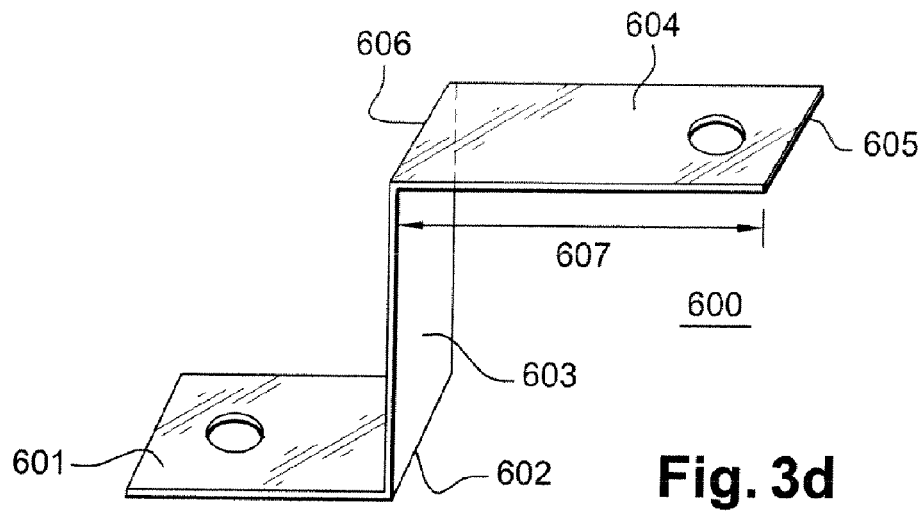

FIG. 3d represents a fourth example of embodiment of a spacer 600. The spacer 600 is equipped with three parts 601, 603 and 604. A first part 601, or bottom part, extends substantially parallel to the upper flange 120 or 110 of the section 100 to which the bottom part 601 is designed to be connected. An extremity 602 of the bottom part 601, designed to be directed towards the wall 2, is integral with an intermediate part 603 which extends perpendicularly to the bottom part 601. A top part 604 extends parallel to the bottom part 601, but in a direction opposite to the direction of the bottom part 601. That is, the top part 604 is designed to extend in the direction of the wall 2. An extremity 605 of the top part 604, opposite to the extremity 606 that is integral with the intermediate part 603, is designed to abut against the wall 2. Therefore the space 4 between the section 100 and the wall 2 is provided through the top part 604 over the entire length 607 of said top part 604.

The spacer 600 therefore allows on the one hand the section, to which it is connected, to be fixed to the ceiling, and on the other hand a constant space to be maintained between the wall and said section.

Once the section 100 is disposed and supported at a constant distance from the wall 2, in such a way as to provide a space 4 between the section 100 and the wall 2, it may be necessary to modulate a space 6 (FIG. 2), by which the air may flow along the wall. To do this, it is possible to provide the suspended ceiling support device 1 with one or more removable panels 700, 710, 720 such as represented in particular in FIGS. 4 and 5. Such removable panels 700, 710, 720 may be disposed over the entire length of the suspended ceiling support device 1, inasmuch where a space 4 between the section 100 and the wall 2 exists.

Figure 4:
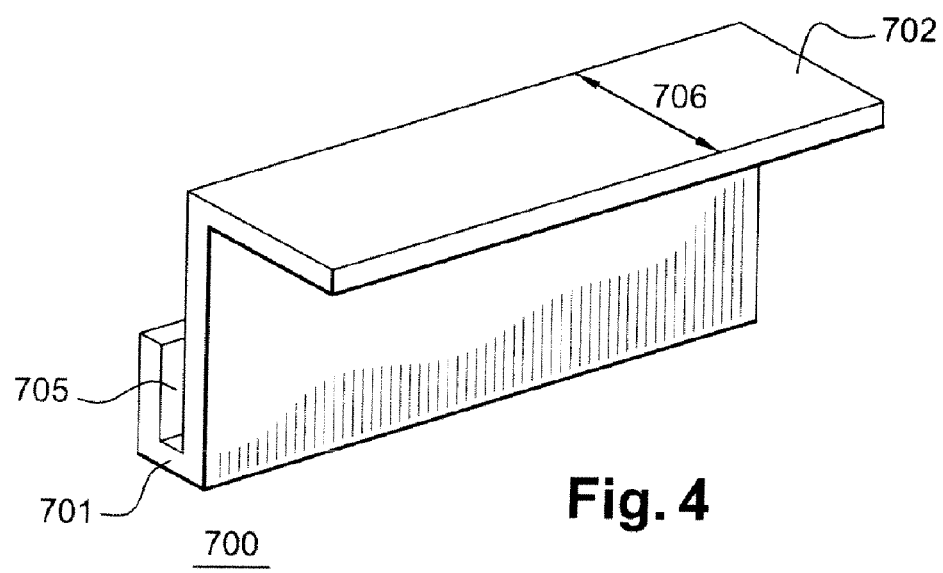
FIG. 4: an example of embodiment of a removable panel of the disclosed embodiments.

In the example represented in FIG. 4, in combination with the description from FIG. 1, one may see the panel 700 according to a particular example of embodiment. The panel 700 comprises means 701 for latching said panel 700 on section 100. In the example represented in FIGS. 1 and 4, the latching means 701 are formed by a slot 705 in which the bottom extremity 126 of the lateral flange 124 may be housed. The slot 705 in which the bottom extremity 126 is housed is such that the panel 700 may slide along the bottom extremity 126 over the entire length of the lateral flange 124 and therefore over the entire length of the section 100. Length of the section 100 is understood to refer to the dimension of the section 100 parallel to the wall 2 and to the ceiling 3. Therefore, it is possible, once the panel 700 is latched on the section 100, to modify a position of the panel 700 along the section 100. In addition, the latching means 701 of the panel 700 are such that the panel 700 may be easily removed and repositioned on the section 100.

The strip 702 of the panel 700 extends in projection from an inner face 125 of the lateral flange 124 of the section 100 directed towards the wall 2, in the direction of the wall 2. Inner face 125 of the lateral flange 124 is understood to refer to the face directed towards the wall 2. The strip 702 therefore allows the passage by which air may pass from space 5 provided between ceiling 3 and suspended ceiling 11 to the building to be modulated. Strip 702 may be a flexible strip (FIG. 1).

The length 706 of the strip 702 may vary. Therefore, according to the length 706 of the strip 702, it is possible to seal partially or completely the space 4. In fact, if the length 706 of the strip 702 is substantially equivalent to the length of the means for maintaining the constant spacing 202, the space 4 is completely sealed. On the other hand, one may utilize a panel 700 wherein the length 706 of the strip 702 is less than the length of the spacing maintenance means 202. Therefore, one only has to reduce the passage 6 by which air may flow.

Depending on the number of panels 700 on section 100 and a distance between each of the panels 700, the flow of air from one location to another in the same building may be modified. Furthermore, depending on the length 706 of the panels 700, the space 4 and therefore the passage 6 through which air may flow is more or less obstructed. It is therefore possible to carry out a multitude of combinations allowing the desired airflow to be obtained, and to modify the airflow as desired by simply removing or displacing the panels 700.

FIG. 5 represents another example of embodiment of a panel 720. Panel 720 comprises a strip 721 and a hook 722. The strip 721 comprises an oblong screw passage opening 723.

The panel 720 represented in FIG. 5 may be utilized in different ways to modulate the space provided between the section and the wall.

Figure 6:
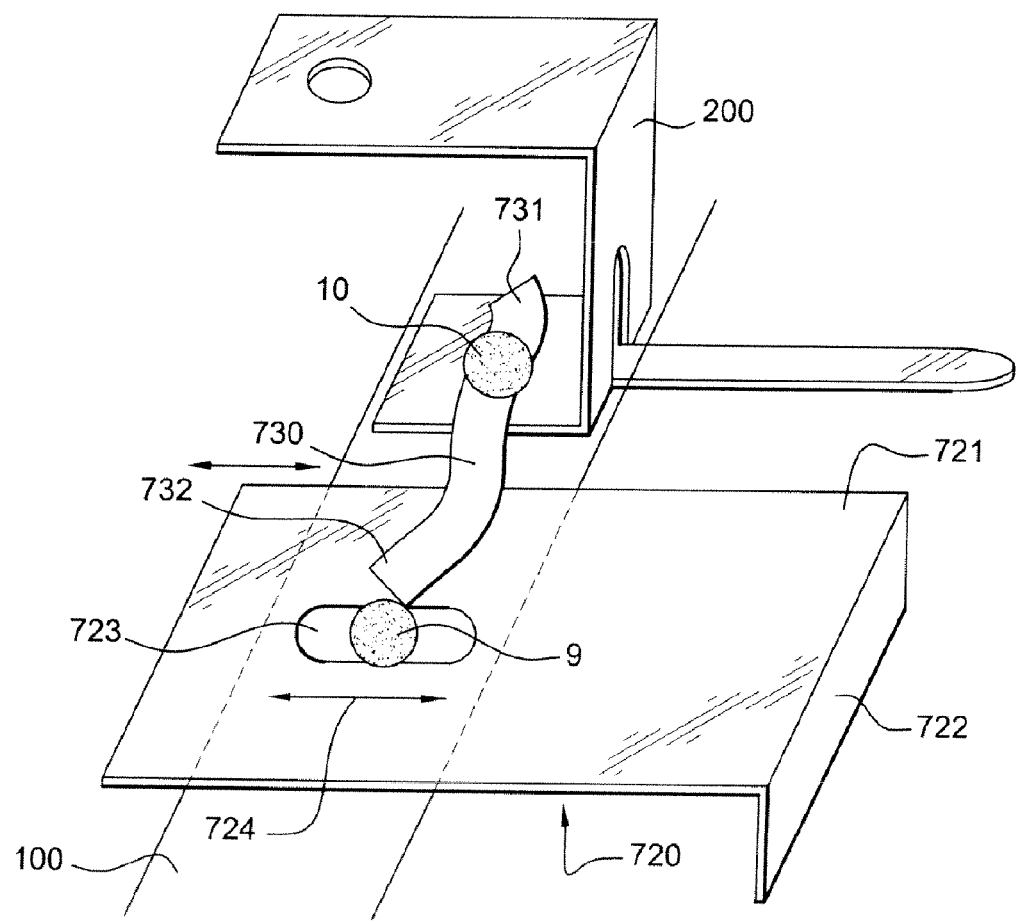
FIG. 6: a schematic representation of a section equipped with a spacer and a panel of the disclosed embodiments.
Figure 7:
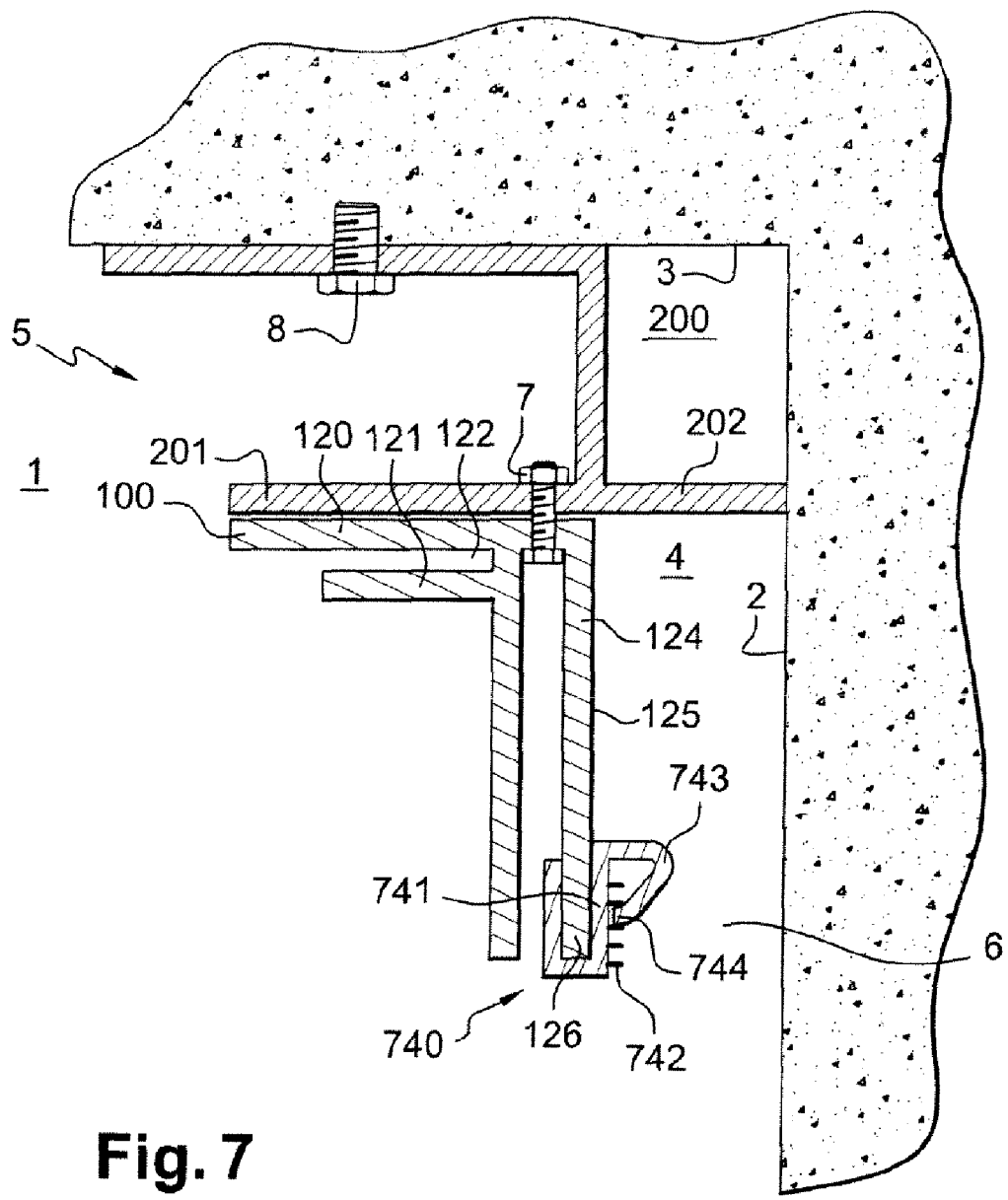
FIG. 7: a section in a vertical plane perpendicular to a wall of a device of the disclosed embodiments according to another example of embodiment of the disclosed embodiments.

In FIG. 6, the panel 720 is disposed on the section 100 between two spacers 200 (only one is visible in FIG. 7). The strip 721 is connected to section 100 through a screw 9. A rod 730 comprises a first extremity 731 fixed, for example through a screw 10, to the spacer 200. A second extremity 732 of the rod 730 rests against the strip 721. The second extremity 732 of the rod 730 allows the panel 720 to be pinned against the section in such a way that said panel 720 remains in position on the section 100. When one wishes to modify a distance between the hook 722 and the wall, in such a way as to modify the space between the section 100 and the wall, the hook 722 is pulled or pushed in such a way as to move the strip 721 backward or forward on section 100, thanks to oblong opening 723.

In another example of embodiment, the rod 730 may be replaced by a spring loaded screw allowing the strip 721 to be fixed to the section 100.

According to another example of embodiment of a suspended ceiling support device of the disclosed embodiments, it is possible to mount panels 700, 710 or 720 indirectly on the section 100. For example, the section 100, or first section, supports a false ceiling, such as a false suspended ceiling, and a second section (not represented), mounted on the first section or on the suspended ceiling, is equipped with panels 700, 710 or 720. The second section may be disposed over the entire exterior contour of the suspended ceiling, or only on a partial exterior contour of said suspended ceiling.

In the example represented in FIG. 7, the section 100 is equipped with another example of embodiment of a removable panel 740.

The panel 740 is latched on the bottom extremity 126 of a flange 125 of the section 100, similarly to panel 700 in the example represented in FIGS. 1 and 4.

The inner face 741 of panel 740, directed towards wall 2 and extending parallel to said wall 2 is equipped with a plurality of steps 742, or ribs, forming protuberances extending perpendicularly to the wall 2. The steps 742 are disposed with some steps under other steps. The number of steps 742 may vary from one panel 740 to another, as well as the spacing between two consecutive steps 742, and their lengths. Length of steps 742 is understood to refer to the dimension of said steps in a direction perpendicular to wall 2. On the same panel 740, the spacing between steps 742, and/or the length of steps 742, may be constant or variable.

The strip 743 of panel 740 is flexible and may be partially folded, in such a way that the free extremity 744 of strip 743 may be held by steps 742. Depending on whether the free extremity 744 of the strip 743 is held by an upper step 742 or a lower strip 742, the air passage 6 is more or less reduced. Upper step is understood to refer to a step situated above a relevant step, and lower step is understood to refer to a step situated below a relevant step. "Held" is understood to mean that the extremity 744 of the strip 743 is maintained in position at the level of the relevant step 742. For example, an interstice is provided between two consecutive steps 742, said interstice being able to receive and maintain the free extremity 744 of strip 743. It is also possible to provide mechanical coupling means on steps 742 and on the free extremity 744 of strip 743 allowing said extremity 744 to be non-irreversibly fixed to a desired step 742.

The number of steps 742 may vary according to the panels 740, and particularly according to the length of the panel 743. The more steps 742 that the panel 740 has, the more the width of the air passage 6 provided between the wall 2 and the suspended ceiling can be adjusted. A panel 740 may therefore allow the passage 6 to be completely obstructed, for example when the free extremity 744 of the strip 743 is not held by the steps 742 and that the strip 743 extends in the direction of the wall 2. The same panel 740, when the strip 743 is folded in such a way, for example, that the free extremity 744 is housed in an interstice provided between two consecutive steps 742, allows the width of the air passage 6 to be reduced.

The user may easily vary the air passage 6, and therefore the airflow, by modifying the position of the free extremity 744 of the strip 743 with relation to steps 742.

The invention claimed is:

1. A device for supporting a suspended ceiling in a building, comprising
a section disposed along walls of the building that is able to support the suspended ceiling,
spacers disposed between the section and the walls of the building, each spacer providing a space between a respective wall and the section to allow air to circulate,
at least one panel able to reduce or obstruct the space allowing air to circulate between the respective wall and the section,
wherein the panel is removably mounted on the section, independently from the respective wall and the suspended ceiling, said panel being disposed below the suspended ceiling and mounted to the section so that a position of said panel on the section is adjustable to modulate the flow of air in the building, the panel comprising a cantilevered strip extending in projection from the section, in the direction of the respective wall, and configured to restrict the flow of air past the panel.

2. The device according to claim 1, further comprising a set of removable panels having different lengths of strips.

3. The device according to claim 1, wherein the panel is configured to elastically engage an edge of the section for securing the panel to the section.

4. The device according to claim 3, wherein the panel is able to slide along said edge.

5. The device according to claim 1, characterized in that the panel may be displaced on the section, in a direction perpendicular to the wall, in such a way as to modulate the space provided between the wall and the section.

6. The device according to claim 5, characterized in that a first extremity of the panel is equipped with a hook, the panel may be displaced in a direction perpendicular to the wall by means of said hook.

7. The device according to claim 6, characterized in that a second extremity of the panel, mounted on a flange of the section, is equipped with an oblong fixation opening, a screw traversing the oblong fixation opening and the flange of the section.

8. The device according to claim 5, characterized in that the device comprises a means to fix the section to a wall of the building, said fixation means of the section being fixed to a flange of the section, the panel being inserted between the flange of the section and the fixation means of the section.

9. The device according to claim 5, characterized in that the panel is maintained on the section, a position of the panel on the section being maintained by a flexible rod, a first extremity of the flexible rod being fixed to the section and a second extremity of said flexible rod in flexible support on the panel.

10. The device according to claim 5, characterized in that the panel is fixed to the section by a spring loaded screw.

11. The device according to claim 1, wherein the strip is a flexible strip.

12. The device according to claim 11, characterized in that an inner face of the panel, directed towards the wall of the building, is equipped with a plurality of steps extending perpendicularly to the wall and able to receive a first extremity of the strip of the partially bent panel.

13. The device according to claim 1, wherein the device comprises an edge molding fixed to the section.

14. The device according to claim 1,
wherein at least one spacer simultaneously comprises a means to fix the at least one spacer to the section and a means to fix the at least one spacer directly to the wall of the building in such a way that the at least one spacer may be secured to the wall and that the section may not be secured to the wall without the at least one spacer.

15. The device according to claim 14, characterized in that a spacer has a general L shape, a strut of the L being fixed to an upper flange of the section and extending parallel to said upper flange, and a base of the L extending substantially parallel to the walls of the building in such a way as to be able to be fixed to a wall of the building, the strut of the L extending in projection from the upper flange of the section in the direction of the wall.

16. The device according to claim 14, characterized in that a spacer has a general U shape, a first branch of the U being integral with an upper flange of the fixation section and extending parallel to said flange, a base of the U extending parallel to the wall in the direction of the ceiling and a second branch of the U extending parallel to the ceiling in the direction of the wall and being able to be fixed to said ceiling, the second branch of the U being designed to abut (309) against the wall.

17. A device for supporting a suspended ceiling in a building, comprising:
a section disposed along walls of the building that is able to support the suspended ceiling,
spacers disposed between the section and the walls of the building, each spacer providing a space between a respective wall and the section to allow air to circulate,
at least one panel able to reduce or obstruct the space allowing air to circulate between the respective wall and the section,
wherein the panel is removably mounted on the section, independently from the respective wall and the suspended ceiling, said panel being disposed below the suspended ceiling in order to be accessible from the building so that a position of said panel on the section may be modified in such a way as to modulate the flow of air in the building, the panel comprising a strip extending in projection from the section, in the direction of the respective wall,
wherein at least one spacer simultaneously comprises a means to fix the at least one spacer to the section and a means to fix the at least one spacer directly to the wall of the building in such a way that the at least one spacer may be secured to the wall and that the section may not be secured to the wall without the at least one spacer, and
wherein the at least one spacer has a general U shape, a first branch of the U being fixed to an upper flange of the section and extending parallel to said flange, a second branch of the U being able to be fixed to the ceiling, a base of the U extending parallel to the wall in the direction of the ceiling, the branches and the base of the U providing a cavity that is open towards an inside of the building, the first branch of the U comprising a tab extending in projection from the upper flange of the section in a direction opposite to the direction of the branches of the U, the tab being designed to abut against the wall.

* * * * *